United States Patent [19]

Forster et al.

[11] Patent Number: 4,640,531
[45] Date of Patent: Feb. 3, 1987

[54] ARRANGEMENT FOR CENTERING CONDUITS

[76] Inventors: Jürgen Forster, Minden; Helmüt Westendorf, Hanover, both of Fed. Rep. of Germany

[21] Appl. No.: 663,444

[22] Filed: Oct. 22, 1984

[30] Foreign Application Priority Data

Nov. 12, 1983 [DE] Fed. Rep. of Germany ....... 3341044

[51] Int. Cl.⁴ ............................................ F16L 35/00
[52] U.S. Cl. ...................................... 285/24; 285/93; 285/325; 285/912; 285/920; 376/260; 376/292
[58] Field of Search .................... 285/24, 25, 26, 27, 285/93, 28, 29, 325, 326, 327, DIG. 13, DIG. 21; 376/260, 292

[56] References Cited

U.S. PATENT DOCUMENTS 3,459,442  8/1969  Yarmett et al. ....................... 285/27
4,392,790  7/1983  Shibata ............................. 285/325 X

FOREIGN PATENT DOCUMENTS 2802535  2/1977  Fed. Rep. of Germany .

Primary Examiner—Dave W. Arola
Attorney, Agent, or Firm—Walter Ottesen

[57] ABSTRACT

The invention is directed to an arrangement for centering conduits to facilitate coupling an end flange of a stationary conduit with an end flange of a conduit section removable in the vertical direction. The conduits interconnect materials processing apparatus in a large-area cell for reprocessing irradiated nuclear fuel. The interface separating the connected flanges is in a vertical plane. The joining of the stationary end flange to the end flange of the movable conduit section is carried out by remote handling and the operator performs the connecting process with the aid of a television monitor. To enable the process of coupling the flanges to be carried out quickly, safely, and in a simple manner, the arrangement of the invention includes an upwardly projecting vertical centering key mounted on the stationary pipe conduit. A V-shaped guide defining mutually adjacent centering surfaces is mounted on the removable conduit section. When the removable conduit section is brought together with the stationary pipe conduit for coupling, the centering surfaces are brought into contact engagement with the key for finely guiding the removable conduit member as the same is moved in elevation so as to cause the respective longitudinal axes of the conduit members to be aligned with each other. The centering arrangement of the invention is an optical aid and provides a visual indication of the position of the conduit section as the latter is moved close to the stationary conduit member and then finely guides the conduit section into its end position.

7 Claims, 3 Drawing Figures

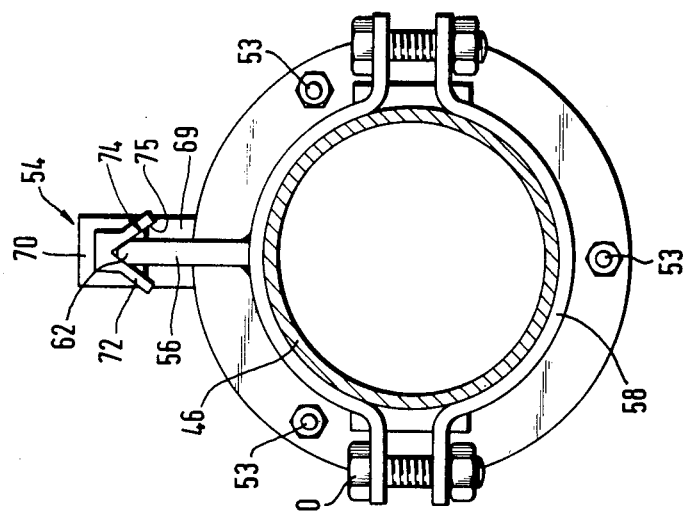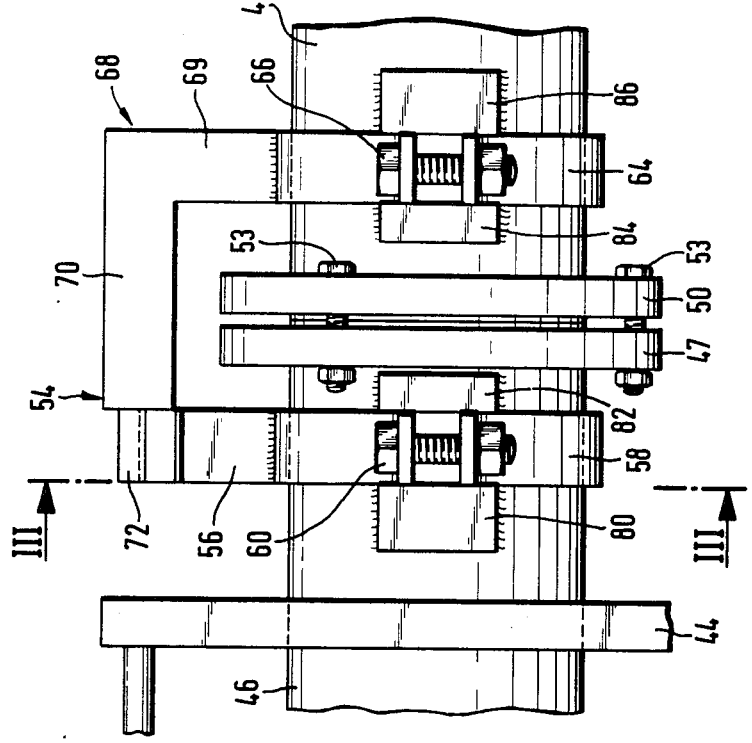

ARRANGEMENT FOR CENTERING CONDUITS

FIELD OF THE INVENTION

The invention relates to a centering arrangement for facilitating the remotely-manipulated connection of the end flange of a removable flanged conduit member to the end flange of a stationary flanged conduit member in an installation equipped with remote handling apparatus. The installation can be a large-area cell for reprocessing irradiated nuclear fuel.

BACKGROUND OF THE INVENTION

Installations for reprocessing irradiated nuclear fuels have large so-called hot cells wherein processing components are accommodated. These cells are shielded with respect to radiation and contain frames known as racks in which the processing components are mounted.

Maintenance work inside the large-area radioactive cells has to be performed without personnel entering the cell. Maintenance work is therefore carried out by travelling remote handling apparatus. In this connection, the racks holding the processing components are placed along the walls of the hot cell in a modular configuration to facilitate remote handling. This makes it possible to exchange a complete rack or parts of a rack.

When a rack or a part thereof is exchanged, all the conduits which connect two racks directly with one another or are connected to conduits leading through the wall of the cell have to be separated by remote handling and reconnected when a new rack or new part thereof has been installed. It is necessary for whole sections of the conduits to be removed in order to enable the rack to be dismantled, since these sections of conduit would prevent a removal or an exchange of the rack.

Removable conduit interconnecting units or removable conduit members are therefore used which have connectable end flanges at the respective ends thereof. When conduits leading through the wall of the cell are connected to conduit connecting ends in the rack, each of the conduit interconnecting units are inserted between a stationary end flange of the conduit plate mounted on the wall of the cell and an end flange of a conduit connecting end of a processing apparatus arranged in the rack. The conduit interconnecting unit is coupled to these two end flanges.

Between these two stationary end flanges, there is a predetermined space into which the interchangeable or removable conduit member is inserted or from which it is removed. The flanges are joined together by known means such as clamping ring couplings or threaded fastener connections.

The conduit pieces to be coupled have to be brought together on center. Since guiding the conduit pieces together must be done by remote handling, there is a particular problem for the operator who monitors and performs the connecting process with aid of television; namely, just before the conduit members are brought together, only a poor view of the coupling location is available. This leads to frequent unsuccessful attempts to insert the interchangeable or removable conduit interconnecting member.

SUMMARY OF THE INVENTION

It is an object of the invention to provide a centering arrangement wherein the coupling process can be performed quickly, with certainty and simply.

When the clamping means holding the end flanges together has been released by remote-handling, the interconnecting removable conduit member is taken out in a vertical direction. After the maintenance work has been done or a rack module has been exchanged, the interconnecting removable conduit member has to be put back into its position to interconnect the conduit connecting ends.

The centering arrangement according to the invention facilitates the remotely-manipulated connection of the end flange of a removable flanged conduit member to the end flange of a stationary flanged conduit member in an installation equipped with remote handling apparatus for positioning the removable flanged conduit member in elevation relative to the stationary conduit member. The installation is a facility such as a large-area cell for reprocessing irradiated nuclear fuel.

Each of the conduit members defines a longitudinal axis and the centering arrangement according to the invention includes: key means mounted on the outer surface of one of the conduit members; centering means mounted on the outer surface of the other one of the conduit members; and, the centering means including centering surfaces adapted for receiving the key means in contact engagement therewith when the removable flanged conduit member has been spatially positioned so as to cause the flanges of the members to be mutually adjacent and the axes to be aligned with each other whereby the conduit members can be joined to each other at the mutually adjacent flanges thereof.

According to a feature of the invention, the key means can be in the form of a centering rod mounted on the outer surface of the stationary conduit member so as to project upwardly therefrom and the centering means can be mounted on the removable conduit member.

For the operator, the centering arrangement according to the invention is an optical aid in bringing together the flanges to be coupled. This is made possible because with the centering arrangement of the invention, the centering process takes place advantageously outside the coupling location rather than inside the same. The flanges to be coupled can therefore be brought together quickly and on center.

According to another feature of the invention, the key means can include a pipe clamp mounted on the stationary conduit member adjacent the end flange thereof and the centering rod can be fixedly mounted on the pipe clamp so as to project upwardly therefrom. Also, the centering means can include: a pipe clamp mounted on the removable conduit member adjacent the end flange thereof; and, an angle bracket having one leg fixedly mounted to the outer peripheral surface of the pipe clamp so as to extend vertically upward therefrom, the other leg of the angle bracket including structure thereon for defining the centering surfaces.

Mounting the centering rod and centering means on pipe clamps fixed about the respective conduit members affords the advantage of providing accurate alignment in the vertical direction. The centering rod arranged on the stationary conduit member may be mounted during the original erection and assembly in the large cell. The centering means on the interchangeable or removable conduit member may be placed thereon in the service area which is in a shielded location above or adjacent the large-area cell.

According to still a further feature of the invention, the centering rod is a flat rod having a wedge-shaped upper end defining an apex extending linearly in a direction parallel to the longitudinal axis of said stationary conduit member. The centering surfaces of the centering receiving means are two in number and the above-mentioned structure is configured to cause the centering surfaces to be mutually adjacent and to conjointly define a wedge-shaped recess having an apex extending parallel to the longitudinal axis of the movable conduit member. This recess opens downwardly to receive the wedge-shaped upper end of the flat rod when the axes are aligned with each other and the end flanges are mutually adjacent.

Thus, a further advantage of the invention is that the centering action extends over wedge-shaped surfaces of a predetermined width. Accurate guidance and stability of the centering arrangement is obtained.

Pursuant to another feature of the invention, abutment means are mounted on the conduit members adjacent the pipe clamps for preventing the latter from becoming axially dislodged when the movable conduit member is placed in position adjacent the stationary conduit member and joined thereto.

Accordingly, any axial displacement of the two parts of the centering arrangement is effectively prevented.

The invention provides a centering arrangement which enables flanges which have to be coupled to be brought together quickly and on center by remote handling.

BRIEF DESCRIPTION OF THE DRAWING

The invention will now be explained in greater detail with reference to the accompanying drawing wherein:

FIG. 2 is a side elevation view, enlarged with respect to FIG. 1, of the coupling between the stationary end flange at the cell wall, and the adjacent connecting flange of the conduit section shown in the coupled condition; and, FIG. 3 is a section view taken along the line III—III of FIG. 2.

DESCRIPTION OF THE PREFERRED EMBODIMENTS OF THE INVENTION

Figure 1:
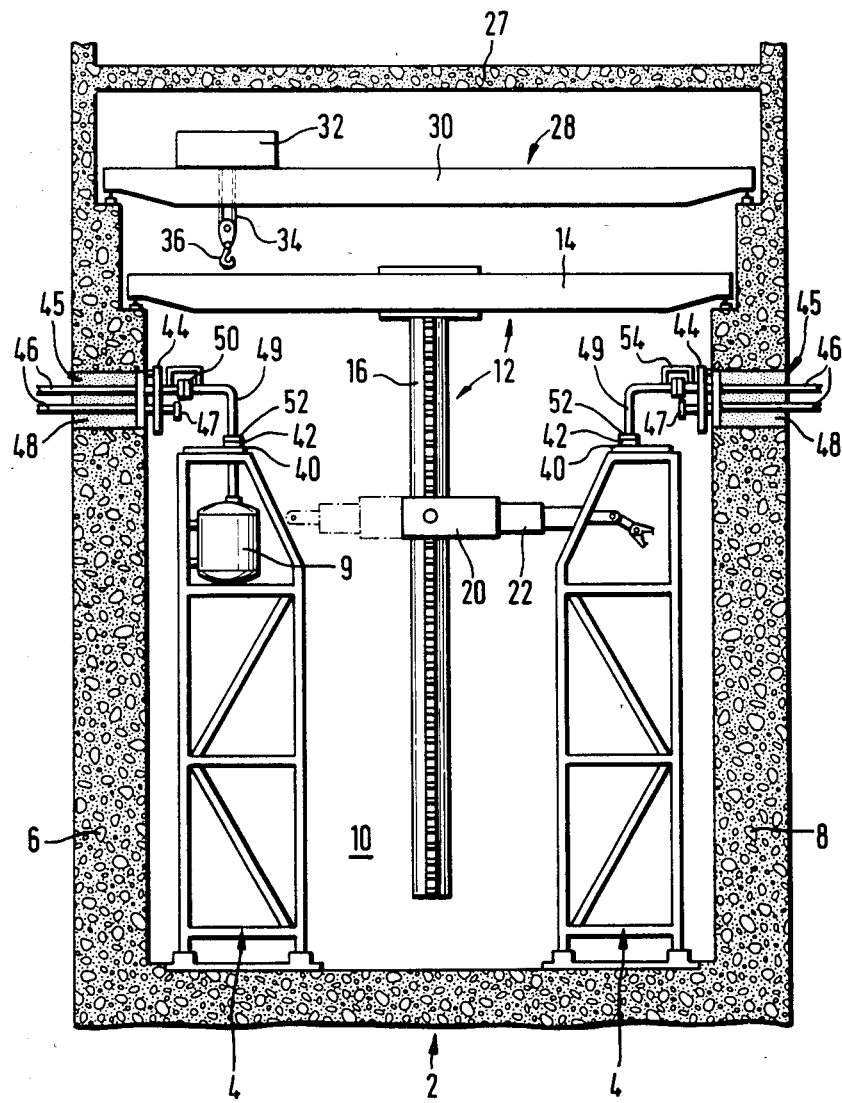
FIG. 1 is a cross-section taken through a large-area cell with racks set up along the walls and with a conduit section between an end flange of a stationary conduit at the cell wall and a stationary connecting end at the rack.

In a large-area cell 2, a plurality of racks 4 are mounted along two mutually adjacent walls 6 and 8 of the cell. The racks 4 can have a grid-like structure and hold the various processing components of which only one container 9 is shown for clarity. The two mutually adjacent rows of racks form a central transporting passage 10. A manipulator carrying apparatus 12 is arranged to be movable along the passage 10. The apparatus 12 includes a bridge beam 14 near the top of the cell which can move in a horizontal plane along rails mounted on respective steps in the walls 6, 8 of the cell 2. A vertical guide column 16 is centrally suspended on the bridge beam 14.

The guide column 16 is rotatable about its longitudinal axis and is fitted with a support 20 which can move upwardly and downwardly and which carries a telescopically extendable arm 22. Manipulators, tools or other remote handling apparatus are adapted for fitting to the end of the arm 22.

A remotely-controllable travelling bridge crane 28 is arranged above the bridge beam 14 of the manipulator carrying apparatus 12 and is only a short distance below the cell ceiling 27. The crane 28 is equipped with a trolley 32 which can be moved along the crane beam 30. The bridge crane 28 carries a hook 36 which is movable in the vertical direction on a wire cable 34.

The racks 4 each have a horizontally mounted conduit connecting plate 40 at the top thereof for receiving the conduit connecting ends 42 for the processing components 9. Above the racks 4 and inside the cell 2, vertically arranged connecting plates 44 are mounted on the cell walls 6, 8. The connecting plates 44 are provided for conduits 46 which are brought in from outside through wall plugs 45 in the cell wall. The plates 44 have end flanges 47 whereat the conduits 46 are brought in and terminate. The plug 45 in the cell wall is filled with granulated lead 48.

At each rack 4 the two connecting plates 40 and 44 are interconnected by an interconnecting conduit section 49. The conduit section 49 is a flanged conduit member having a connecting end flange 50, 52 at each end. End flange 50 is joined by threaded fasteners 53 to the end flange 47 at the cell wall and the end flange 52 is joined to the end flange 42 of the plate 40. When the threaded fasteners 53 have been released, the conduit section 49 can be removed in a vertical direction.

The horizontal portions of conduits 46 and 49 are provided with a centering arrangement 54 to bring the flange 47 of horizontal conduit section 46 and the flange 50 of the horizontal conduit section 49 together on center. The centering arrangement 54 (FIGS. 2 and 3) includes a key means having a centering key 56 which is mounted adjacent the end flange 47 of the stationary conduit 46 and projects vertically upward. The key means further includes a conduit clamp 58 to which the key 56 in the form of a flat rod is welded so as to lie in the same plane as the axis of the clamp 58. The key means is fixedly attached to stationary conduit 46 by threaded fasteners 60 as shown. The key 56 has a wedge-shaped tip 62 and lies in a plane passing through the longitudinal axis of the conduit 46.

A conduit clamp 64 is similarly fixed to the removable pipe conduit section 49 adjacent the conduit flange 50 with aid of threaded fasteners 66 as shown. An angular bracket 68 projects vertically upwards from clamp 64 and has vertical leg 69 welded to the latter. The bracket 68 has a horizontal leg 70 and a V-shaped guide 72 is welded onto the outer end thereof. The V-shaped guide 72 defines a wedge-shaped recess 74 which opens downwardly toward the conduit. The recess 74 is aligned parallel with the axis of the conduit and thus coacts with the wedge-shaped tip 62 of the centering key 56. The inclined surfaces 75 of the wedge-shaped recess 74 of the guide 72 form the centering surfaces for the key 56 during the centering process.

At both sides of each conduit clamp 58 and 64, limit blocks 80, 82 and 84, 86 are welded onto the outer surface of the corresponding conduit in the region of the threaded fasteners 60 and 66. The blocks 80, 82 and 84, 86 prevent any axial displacement of the conduit clamps 60, 66.

The operation of the arrangement according to the invention described above will now be explained.

If the rack 4 or part of it has to be dismantled, the conduit connections between the conduit connection plate 40 of the rack 4 and the conduit connection plate 44 of the cell wall must first be disconnected and the conduit connecting section 49 removed. An impact wrench carried by the manipulator arm 22 releases the threaded fastener connections of the coupled flanges. The interconnecting conduit section 49 is thereupon raised upwardly by the crane 36 from the position in which it was connected to the conduit connecting ends. The rack 4 is now freely exchangeable.

After the rack 4 has been exchanged, the conduit connecting ends have to be reconnected. For this purpose, the particular interconnecting conduit section 49 is lowered by the crane 28 into the position between the two end flanges 47 and 42 of the plates 44 and 40, respectively, which are to be interconnected. With the aid of a television unit, the operator then aligns the entry of the interconnecting conduit section 49 on his screen, to the centering arrangement 54 located outside of the coupling location. This visual observation thus enables the coupling position to be approached with considerable accuracy. Fine centering of the flanges 47 and 50 to each other is obtained within the fine range by placing the guide 72 on the centering key 56. The wedge-shaped tip 62 of the centering key 56 comes into contact engagement with the inclined centering surfaces 75 of the guide 72 and, on further lowering of the conduit section 49, centers the conduit flange 50 accurately relative to the end flange 47 of the stationary conduit 46. When the two flanges 47 and 50 have been brought together with exact centering, they are joined by an impact wrench carried by the extendable arm 22 which retightens the threaded fasteners 53.

It is understood that the foregoing description is that of the preferred embodiments of the invention and that various changes and modifications may be made thereto without departing from the spirit and scope of the invention as defined in the appended claims.

What is claimed is:

1. A centering arrangement for facilitating the remotely-manipulated connection of the end flange of a removable flanged conduit member to the end flange of a stationary flanged conduit member in an installation equipped with remote viewing apparatus and remote handling apparatus for moving the removable flanged conduit member in elevation relative to the stationary conduit member, the installation being a facility such as a large-area cell for reprocessing irradiated nuclear fuel, each of said conduit members defining a longitudinal axis and the centering arrangement comprising:

key means mounted on the outer surface of one of said conduit members and extending outwardly therefrom in a direction transverse to the longitudinal axis thereof, said key means terminating in an outermost tip;

centering means mounted on the outer surface of the other one of said conduit members;

said centering means including two mutually adjacent centering surfaces joined together to form an apex and define a trough-like centering structure for receiving the outermost tip of said key means in contact engagement therewith whereupon said key means and said centering structure coact to finely guide said removable flanged conduit member as the latter is moved in elevation perpendicularly to the longitudinal axis of said stationary member so as to cause said axes to become aligned with each other when said key means outermost tip seats in said apex whereby said conduit members can be joined to each other at said mutually adjacent flanges thereof; and, said centering surfaces and the outermost tip of said key means being disposed in spaced relationship to said conduit members, respectively, so as to facilitate remote viewing with aid of said remote viewing apparatus during the remote handling of said removable flanged conduit member.

2. The centering arrangement of claim 1, said end flanges conjointly defining a separation interface disposed in a vertical plane when connected to each other; said key means being in the form of a centering rod mounted on said outer surface of said stationary flanged conduit membe so as to project upwardly therefrom; said centering means being mounted on said removable flanged conduit member.

3. The centering arrangement of claim 2, said key means including a pipe clamp mounted on said stationary conduit member adjacent said end flange thereof, said centering rod being fixedly mounted on said pipe clamp so as to project upwardly therefrom.

4. A centering arrangement for facilitating the remotely-manipulated connection of the end flange of a removable flanged conduit member to the end flange of a stationary flanged conduit member in an installation equipped with remote viewing apparatus and remote handling apparatus for moving the removable flanged conduit member in elevation relative to the stationary conduit member, the installation being a facility such as a large-area cell for reprocessing irradiated nuclear fuel, each of said conduit members defining a longitudinal axis and the centering arrangement comprising:

key means mounted on the outer surface of one of said conduit members and extending outwardly therefrom in a direction transverse to the longitudinal axis thereof, said key means terminating in an outermost tip;

centering means mounted on the outer surface of the other one of said conduit members;

said centering means including centering surfaces adapted for receiving the outermost tip of said key means in contact engagement therewith and for finely guiding said removable flanged conduit member into position adjacent said stationary flanged conduit member as the same is moved in elevation so as to cause said axes to be aligned with each other whereby said conduit members can be joined to each other at said mutually adjacent flanges thereof;

said end flanges conjointly defining a separation interface disposed in a vertical plane when connected to each other; said key means being in the form of a centering rod mounted on said outer surface of said stationary flanged conduit member;

said key means including a pipe clamp mounted on said stationary conduit member adjacent said end flange thereof, said centering rod being fixedly mounted on said pipe clamp so as to project upwardly therefrom;

said centering means including: a pipe clamp mounted on said removable flanged conduit member adjacent said end flange thereof; an angle bracket having one leg fixedly mounted to the outer peripheral surface of said pipe clamp so as to extend vertically upwardly therefrom, the other leg of said angle bracket including structure thereon for defining said centering surfaces; and, said centering surfaces and the outermost tip of said key means being disposed in spaced relationship to said conduit members, respectively, so as to facilitate remote viewing with aid of said remote viewing apparatus during the remote handling of said removable flanged conduit member.

5. The centering arrangement of claim 4, said centering rod being a flat rod having a wedge-shaped upper end defining an apex extending linearly in a direction parallel to the longitudinal axis of said stationary flanged conduit member, said centering surfaces being two in number and said structure being configured so as to cause said centering surfaces to be mutually adjacent and to conjointly define a wedge-shaped recess having an apex extending parallel to the longitudinal axis of said removable flanged conduit member and opening downwardly to receive said wedge-shaped upper end of said flat rod for finely guiding said removable flanged conduit member as the same is moved in elevation so as to cause said axes to be aligned with each other.

6. The centering arrangement of claim 5, comprising abutment means mounted on said conduit members adjacent said pipe clamps for preventing the latter from becoming axially dislodged when said movable flanged conduit member is placed in position adjacent said stationary flanged conduit member and joined thereto.

7. The centering arrangement of claim 6, said abutment means comprising: a first set of limiting blocks fixedly attached to the outer surface of said stationary flanged conduit member so as to abut the respective lateral edges of said pipe clamp mounted thereon; and, a second set of limiting blocks fixedly attached to the outer surface of said removable flanged conduit member so as to abut the respective lateral edges of said pipe clamp mounted thereon.

* * * * *